United States Patent
Ha et al.

(10) Patent No.: US 10,965,205 B2
(45) Date of Patent: Mar. 30, 2021

(54) POWER CONVERSION SYSTEM FOR VEHICLES

(71) Applicants: Hyundai Motor Company, Seoul (KR); Kia Motors Corporation, Seoul (KR)

(72) Inventors: Tae Jong Ha, Seoul (KR); In Yong Yeo, Gyeonggi-do (KR); Dae Woo Lee, Incheon (KR); Youn Sik Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 190 days.

(21) Appl. No.: 16/153,279

(22) Filed: Oct. 5, 2018

(65) Prior Publication Data

US 2019/0312499 A1      Oct. 10, 2019

(30) Foreign Application Priority Data

Apr. 9, 2018  (KR) .......................... 10-2018-0041263

(51) Int. Cl.
   *H02M 1/08*       (2006.01)
   *H02J 7/02*       (2016.01)
   (Continued)

(52) U.S. Cl.
   CPC .............. *H02M 1/08* (2013.01); *B60L 53/22* (2019.02); *H02J 7/022* (2013.01); *H02J 7/06* (2013.01);
   (Continued)

(58) Field of Classification Search
   CPC ............... H02M 1/08; H02M 3/33576; H02M 2001/0054; H02M 2001/007; H02M 3/337; H02M 2001/0048; B60L 53/22; B60L 2210/40; B60L 2210/30; B60L 2210/12; B60L 53/14; B60L 58/20; B60L 1/003; B60L 1/00; B60L 2210/14; B60L 53/20; B60L 2210/10; B60L 2240/527;
   (Continued)

(56) References Cited

U.S. PATENT DOCUMENTS

| | | | |
|---|---|---|---|
| 9,362,838 B1* | 6/2016 | Balogh | H02M 7/04 |
| 2014/0203634 A1* | 7/2014 | Sugiyama | B60L 3/04 |
| | | | 307/10.1 |
| 2018/0287466 A1* | 10/2018 | Kim | H02P 27/06 |

FOREIGN PATENT DOCUMENTS

| | | |
|---|---|---|
| KR | 20140114175 A | 9/2014 |
| KR | 20160013551 A | 2/2016 |

\* cited by examiner

*Primary Examiner* — Arnold M Kinkead
(74) *Attorney, Agent, or Firm* — Mintz Levin Cohn Ferris Glovsky and Popeo, P.C.; Peter F. Corless

(57) ABSTRACT

A power conversion system for vehicles is provided. The system includes a first energy storage device and a charging device with a rectification circuit for rectifying AC power to generate a DC link voltage. A DC-DC converter converts the level of the DC link voltage to generate a charging voltage of the first energy storage device. A low voltage DC-DC converter selectively down-converts one of the voltage of the first energy storage device and the DC link voltage to output a low voltage having a predetermined level. The low voltage DC-DC converter selectively converts one of the voltage of the first energy storage device and the DC link voltage into the low voltage based on whether the first energy storage device is charged according to input of the AC power.

17 Claims, 3 Drawing Sheets

(51) Int. Cl.
*H02J 7/06* (2006.01)
*H02M 3/335* (2006.01)
*B60L 53/22* (2019.01)
*H02M 1/00* (2006.01)
*H02J 7/00* (2006.01)

(52) U.S. Cl.
CPC ..... *H02M 3/33576* (2013.01); *B60L 2210/30* (2013.01); *B60L 2210/40* (2013.01); *H02J 7/0072* (2013.01); *H02M 2001/0054* (2013.01)

(58) Field of Classification Search
CPC ......... B60L 2200/91; H02J 7/022; H02J 7/06; H02J 7/0072; H02J 2207/20; H02J 7/02; Y02T 10/70; Y02T 10/72
USPC .......... 318/376, 139; 320/162, 109; 307/9.1, 307/10.1
See application file for complete search history.

POWER CONVERSION SYSTEM FOR VEHICLES

CROSS REFERENCE TO RELATED APPLICATION

The present application claims priority to Korean Patent Application No. 10-2018-0041263, filed Apr. 9, 2018, the entire contents of which is incorporated herein for all purposes by this reference.

BACKGROUND

1. Field of the Invention

The present invention relates to a power conversion system for vehicles, and more specifically, to a power conversion system for vehicles that prevents efficiency deterioration due to switching loss increase in a low voltage DC-DC converter, caused by efficiency decrease of the low voltage DC-DC converter in a low load state and a voltage increase trend of a high voltage battery.

2. Description of the Related Art

As global warming and environmental pollution concerns have increased, research and development of environmentally-friendly vehicles for minimizing environmental pollution are actively being conducted in the vehicle industry and the market therefor is gradually extending. Electric vehicles, hybrid vehicles and plug-in hybrid vehicles, which employ a motor generating drive force using electric energy instead of an engine generating drive force by burning fossil fuel, are being developed as environmentally-friendly vehicles.

Among these environmentally-friendly vehicles using such electric energy, electric vehicles and plug-in hybrid vehicles charge batteries mounted therein with power provided from external charging equipment connected to a grid and produce kinetic energy necessary to drive vehicles using the power stored in the batteries. Accordingly, environmentally-friendly vehicles include a vehicle-mounted charger that converts grid power provided from the external charging equipment into power for charging batteries.

Additionally, direct current (DC) power obtained by converting alternating current (AC) grid power by an on-board charger (OBC) may be applied to an on-board high voltage battery to charge the high voltage battery. Meanwhile, a terminal of a high voltage battery may be connected to a high voltage load such as an air-conditioning system of a vehicle and a low voltage DC-DC converter (LDC) which converts a high voltage into a low voltage. The LDC down-converts the voltage of the high voltage battery to generate a voltage for operation of an electronic load or for charging a low voltage battery.

In general, the LDC has characteristics that efficiency abruptly decreases in a low load section. Furthermore, the LDC has characteristics that switching loss of switching elements included therein increases when an input voltage, that is, the voltage of the high voltage battery, is high. While the high voltage battery is being charged by an OBC, the corresponding vehicle operates only minimum loads required for vehicle charging, and thus the LDC operates in a low load section. Accordingly, the efficiency of the LDC abruptly decreases, thereby reducing charging efficiency. Particularly, considering the industrial trend toward higher capacity and higher output voltage of high voltage batteries for increasing electric vehicle range, it is expected that switching loss of the LDC will further increase and thus, the efficiency thereof will be further deteriorated, reducing overall charging efficiency in the future.

Details described as the background art are intended merely for the purpose of promoting the understanding of the background of the present invention and should not be construed as an acknowledgment of the prior art that is not known to those of ordinary skill in the art.

SUMMARY

The present invention provides a power conversion system for vehicles which is capable of preventing efficiency deterioration due to switching loss increase in a low voltage DC-DC converter, caused by efficiency decrease of the low voltage DC-DC converter in a low load state and a voltage increase trend of a high voltage battery.

According to one aspect, the present invention provides a power conversion system for vehicles which may include: a first energy storage device; a charging device having a rectification circuit configured to rectify AC power to generate a DC link voltage, and a DC-DC converter configured to convert the level of the DC link voltage to generate a charging voltage of the first energy storage device; a first low voltage DC-DC converter configured to down-convert the voltage of the first energy storage device to output a low voltage having a predetermined level; and a second low voltage DC-DC converter configured to convert the DC link voltage to output the low voltage, wherein the first low voltage DC-DC converter and the second low voltage DC-DC converter may be driven selectively based on whether the first energy storage device is charged according to input of the AC power.

In an exemplary embodiment of the present invention, the first low voltage DC-DC converter may be shut off and the second low voltage DC-DC converter may be driven when the charging device operates to charge the first energy storage device. The first low voltage DC-DC converter may be driven and the second low voltage DC-DC converter may be shut off when the first energy storage device is not charged.

In addition, the power conversion system may further include a switching unit configured to control an electrical connection between the first energy storage device and the first low voltage DC-DC converter. The switching unit may short-circuit when the first low voltage DC-DC converter is driven and the second low voltage DC-DC converter is shut off and may be open when the first low voltage DC-DC converter is shut off and the second low voltage DC-DC converter is driven.

In an exemplary embodiment of the present invention, the first low voltage DC-DC converter may include: an AC generation circuit configured to convert the output voltage of the first energy storage device into an AC voltage; a transformer having a primary coil to which the AC voltage converted by the AC generation circuit is applied and a secondary coil for transforming the level of the AC voltage applied to the primary coil based on a turn ratio with respect to the primary coil; and a DC generation circuit configured to convert the AC voltage output from the secondary coil of the transformer into a DC voltage.

The AC generation circuit may include a capacitor, a first switching element and a second switching element serially connected between both terminals of the first energy storage device. A first end of the primary coil of the transformer may be connected to the connection node of the capacitor and the first energy storage device, a second end of the primary coil of the transformer may be connected to the connection node of the first switching element and the second switching element, and the first switching element and the second switching element may alternately turn on/off to apply the AC voltage to the primary coil of the transformer.

The transformer may include a first secondary coil and a second secondary coil connected to each other in series. The DC generation circuit may include a first diode having an anode connected to a first end of the first secondary coil, a second diode having an anode connected to a first end of the second secondary coil and a cathode connected to a cathode of the first diode, an inductor connected between the cathode of the first diode and one terminal of an auxiliary battery, and a capacitor connected between both terminals of the auxiliary battery, and the connection node of the first secondary coil and the second secondary coil may be connected to the other terminal of the auxiliary battery.

In addition, the second low voltage DC-DC converter may include: an AC generation circuit configured to convert the DC link voltage into an AC voltage; a transformer having a primary coil to which the AC voltage converted by the AC generation circuit is applied and a secondary coil for transforming the level of the AC voltage applied to the primary coil based on a turn ratio with respect to the primary coil; and a DC generation circuit configured to convert the AC voltage output from the secondary coil of the transformer into a DC voltage.

In particular, the AC generation circuit may include a capacitor, a third switching element and a fourth switching element serially connected between both terminals of the first energy storage device, a first end of the primary coil of the transformer may be connected to the connection node of the capacitor and the first energy storage device, a second end of the primary coil of the transformer may be connected to the connection node of the third switching element and the fourth switching element, and the third switching element and the fourth switching element may alternately turn on/off to apply the AC voltage to the primary coil of the transformer.

The transformer may include a first secondary coil and a second secondary coil connected to each other in series. The DC generation circuit may include a third diode having an anode connected to the first end of the first secondary coil, a fourth diode having an anode connected to the first end of the second secondary coil and a cathode connected to a cathode of the third diode, an inductor connected between the cathode of the third diode and one terminal of an auxiliary battery, and a capacitor connected between both terminals of the auxiliary battery, and the connection node of the first secondary coil and the second secondary coil may be connected to the other terminal of the auxiliary battery.

The first low voltage DC-DC converter may include: a first AC generation circuit configured to convert the output voltage of the first energy storage device into an AC voltage; a transformer having a primary coil to which the AC voltage converted by the first AC generation circuit is applied and a secondary coil for transforming the level of the AC voltage applied to the primary coil based on a turn ratio with respect to the primary coil; and a DC generation circuit configured to convert the AC voltage output from the secondary coil of the transformer into a DC voltage. The second low voltage DC-DC converter may include a second AC generation circuit configured to convert the DC link voltage into an AC voltage and provide the AC voltage to the transformer. The first AC generation circuit and the second AC generation circuit may be selectively driven based on whether the first energy storage device is charged according to input of the AC power.

Another aspect of the present invention to accomplish the object provides a power conversion system for vehicles which may include: a first energy storage device; a charging device having a rectification circuit configured to rectify AC power to generate a DC link voltage, and a DC-DC converter configured to convert the level of the DC link voltage to generate a charging voltage of the first energy storage device; and a low voltage DC-DC converter configured to selectively down-convert one of the voltage of the first energy storage device and the DC link voltage to output a low voltage having a predetermined level. The low voltage DC-DC converter may be configured to selectively convert one of the voltage of the first energy storage device and the DC link voltage into the low voltage based on whether the first energy storage device is charged according to input of the AC power.

In an exemplary embodiment of the present invention, the low voltage DC-DC converter may include: a first AC generation device configured to convert the output voltage of the first energy storage device into an AC voltage; a second AC generation device configured to convert the DC link voltage into an AC voltage; a transformer having serially connected first and second primary coils to which the AC voltages generated by the first and second AC generation devices are applied, respectively, and a secondary coil electromagnetically coupled to the first and second primary coils. The transformer may be configured to transform the levels of the AC voltages applied to the first and second primary coils and induce the transformed AC voltage to the secondary coil. Additionally, the convert may include and a DC generation circuit configured to convert the AC voltage into a DC voltage.

In an exemplary embodiment of the present invention, the first AC generation device may be shut off and the second AC generation device may be driven when the charging device operates to charge the first energy storage device. The first AC generation device may be driven and the second AC generation device may be shut down when the first energy storage device is not charged. The power conversion system may further include a switching unit configured to control electrical connection between the first energy storage device and the first AC generation device. The switching unit short-circuits when the first AC generation device is driven and the second AC generation device is shut down and is open when the first AC generation device is shut off and the second AC generation device is driven.

According to the power conversion system for vehicles, different low voltage DC-DC converters may be driven selectively during charging corresponding to a low load condition and during traveling of a vehicle corresponding to a high load condition to supply power to an auxiliary battery and an electronic load. Accordingly, power loss and switching may be reduced, compared to the conventional system of converting a high voltage of a high voltage battery to a low voltage irrespective of a load condition, to improve system efficiency. Particularly, the power conversion system for vehicles may reduce switching loss by receiving a DC link voltage of a charging device, which is lower than the voltage of the high voltage battery, as an input as necessary.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a power conversion system for vehicles according to various exemplary embodiments of the present invention will be described in more detail with reference to the attached drawings.

Figure 1:
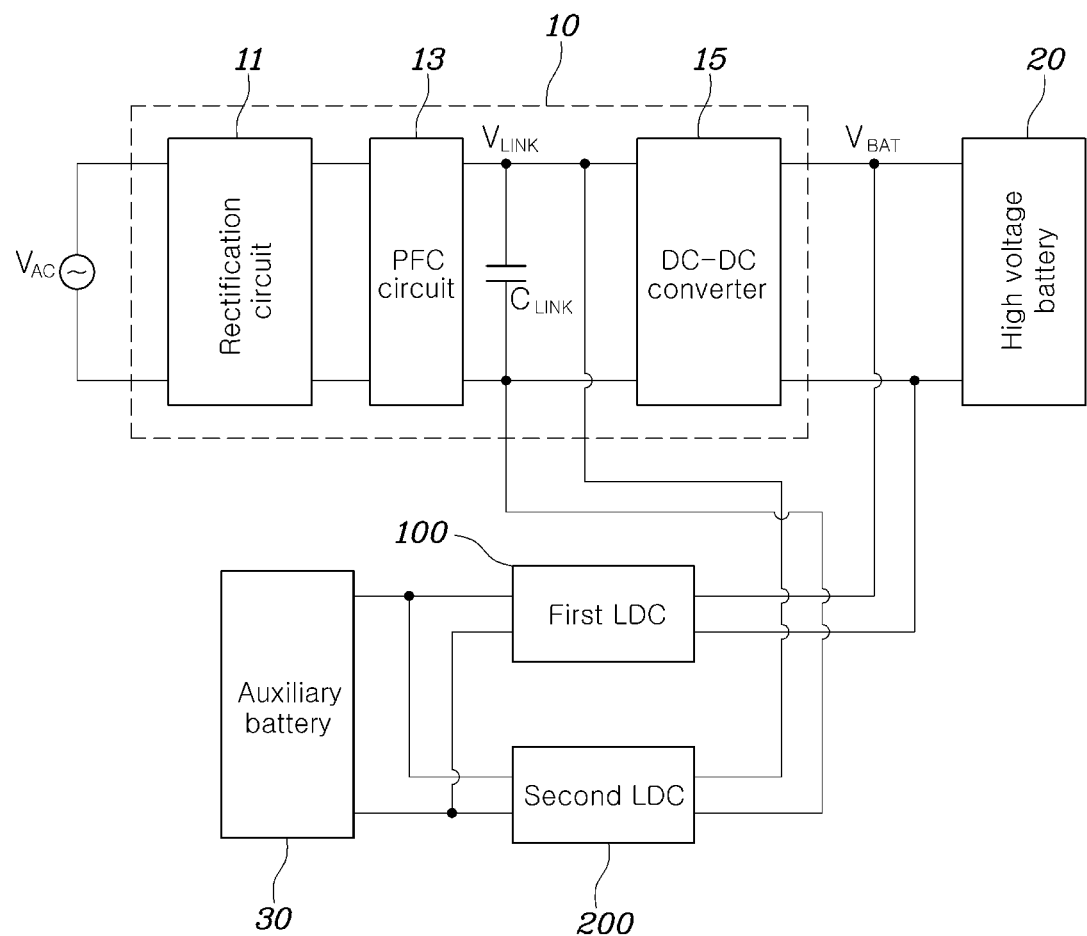
FIG. 1 is a block diagram of a power conversion system for vehicles according to an exemplary embodiment of the present invention.

FIG. 1 is a block diagram of a power conversion system for vehicles according to an exemplary embodiment of the present invention. Referring to FIG. 1, the power conversion system for vehicles according to an exemplary embodiment of the present invention may include an on-board charger (OBC) 10 mounted within a vehicle, a high voltage battery 20, a plurality of low voltage DC-DC converters (LDCs) 100 and 200, and an auxiliary battery 30.

The high voltage battery 20 is an energy storage device that provides energy to a drive motor which provides driving force to wheels of an electric vehicle or a hybrid vehicle and may also be referred to as a main battery. The high voltage battery 20 may be charged with power supplied from external charging equipment (not shown). The external charging equipment for charging the high voltage battery 20 may provide direct current (DC) power or alternating current (AC) power to the vehicle. In general, commercial AC power may be provided to the vehicle for charging the high voltage battery 20 in the case of slow charging.

The auxiliary battery 30 is an energy storage device configured to output a lower voltage than the voltage output from the high voltage battery 20 and may also be referred to as a low voltage battery. Particularly, the auxiliary battery 30 may be configured to supply power to electronic loads of the vehicle. In various exemplary embodiments of the present invention, the auxiliary battery 30 may be charged by being selectively supplied power from the first LDC 100 which converts the energy stored in the high voltage battery 20 into a low voltage and the second LDC 200 which converts a DC link voltage $V_{LINK}$ from the OBC 10 into a low voltage.

The OBC 10 may be configured to convert AC power supplied from the external charging equipment into DC power having a voltage level required to charge the high voltage battery 20 during slow charging. More specifically, the OBC 10 may include a rectification circuit 11 configured to rectify AC power to output a DC voltage, and a DC-DC conversion circuit 15 configured to convert the level of the DC link voltage $V_{LINK}$ which is the DC voltage generated through rectification of the rectification circuit 11 into a level that corresponds to a charging voltage of the high voltage battery 20. For example, the rectification circuit 11 may be a full bridge circuit having four diodes or four switching elements.

Furthermore, a power factor correction (PFC) circuit 13 may be disposed between the rectification circuit 11 and the DC-DC conversion circuit 15. The PFC circuit 13 may be configured to adjust the power factor of AC input and output the power-factor-adjusted AC input and may be configured by employing the topology of a boost converter composed of an inductor and a switching element. The PFC circuit 13 may be selectively applied in consideration of various conditions.

The configuration shown in FIG. 1 includes the PFC circuit 13 and the DC link voltage $V_{LINK}$ may be generated at the output terminals of the PFC circuit 13. However, the DC link voltage $V_{LINK}$ should be understood as a voltage generated through AC-DC conversion and applied across terminals to which elements requiring DC input are connected, that is, terminals of a DC link capacitor $C_{LINK}$, and thus the output terminals of the rectification circuit 11 may be terminals of a DC link in an example in which the PFC circuit 13 is not applied. Accordingly, the PFC circuit 13 may be understood as an element included in the rectification circuit 11, and the rectification circuit may be described as an element which generates the DC link voltage $V_{LINK}$ in a broad sense. In a different aspect, the DC link voltage $V_{LINK}$ may be understood as an input voltage of the DC-DC conversion circuit 15 used to generate the charging voltage of the high voltage battery 20.

Further, the DC-DC conversion circuit 15 may be configured to convert the level of the DC link voltage $V_{LINK}$ and output the converted DC link voltage. The voltage output from the DC-DC conversion circuit 15 may be a voltage for charging the high voltage battery 20 and may be referred to as a high voltage battery charging voltage $V_{BAT}$. The voltage of the high voltage battery 20 may be about 400V or greater, in general, and thus the DC link voltage $V_{LINK}$ generated by rectifying commercial AC power may be unable to charge the high voltage battery. The DC-DC conversion circuit 15 may be configured to up-convert the DC link voltage $V_{LINK}$ to generate the charging voltage $V_{VAT}$ capable of charging the high voltage battery 20.

Various exemplary embodiments of the present invention include the LDC 100 connected to the high voltage battery 20 to convert the terminal voltage of the high voltage battery 20 into a lower voltage, and the LDC 200 configured to down-convert the DC link voltage $V_{LINK}$ of DC link terminals in the OBC 10. The input terminals of the first LDC 100 may be connected to the terminals of the high voltage battery 20 such that the first LDC 100 down-converts the terminal voltage of the high voltage battery 20 to output a voltage having a level applicable to the auxiliary battery 30. The output terminals of the first LDC 100 may be connected to the auxiliary battery 30 and an electronic load (not shown) of the vehicle.

The input terminals of the second LDC 200 may be connected to the DC link terminals in the OBC 10 such that the second LDC 200 down-converts the DC link voltage $V_{LINK}$ to output a voltage having a level applicable to the auxiliary battery 30. The output terminals of the second LDC 200 may be connected to the auxiliary battery 30 and an electronic load (not shown) of the vehicle. In other words, the second LDC 200 may share the output terminals with the first LDC 100.

Since the voltage of the high voltage battery 20 may be a few hundred V (e.g., about 400V or greater), the voltage of the auxiliary battery 30 may be tens of volts (e.g., about 12V to 24V), and the DC link voltage $V_{LINK}$ generated by rectifying a commercial AC voltage may be approximately 300V, in general, the first LDC 100 has a greater DC input voltage than the second LDC 200 and needs to convert the voltage by a considerable level. The second LDC 200 may have a smaller voltage conversion range and a lower input voltage than the first LDC 100, and thus it may be composed of less expensive electronic parts having lower electromagnetic characteristics (e.g., voltage-resistant capacity) than those of the first LDC 100. In addition, the second LDC 200 may have less power loss than the first LDC 100 due to the smaller voltage conversion range. Furthermore, the second LDC 200 may be configured to receive and switch a lower voltage than that applied to the first LDC 100 and thus switching loss caused by switching elements included in the second LDC 200 may be reduced.

Various exemplary embodiments of the present invention may selectively drive or operate the first LDC 100 and the second LDC 200 based on whether the vehicle is charged. For example, when the vehicle is electrically connected to the external charging equipment and supplied with AC power from the external charging equipment, that is, when the high-voltage battery 20 is being charged, the first LDC may not be driven (e.g., shut off) and the second LDC 200 may be driven. In particular, a controller having a processor and a memory may be configured to operate the first and second LDCs. The controller may be specifically programmed to operate the components described herein.

In other words, in a low load state such as when the high voltage battery of the vehicle is being charged by the external charging equipment, power loss and switching loss may be reduced by shutting off the first LDC 100 and driving the second LDC 200 to improve system efficiency. Furthermore, the second LDC 200 may be shut off and the first LDC 100 may be driven when the vehicle is traveling such that high load caused by various electronic parts required during traveling of the vehicle may operate more smoothly. Selective driving of the first LDC 100 and the second LDC 200 may be performed by one of controllers mounted within the vehicle. For example, a hybrid power control unit (HPCU) may be configured to perform selective driving of the first LDC 100 and the second LDC 200 and control a driven LDC.

Figure 2:
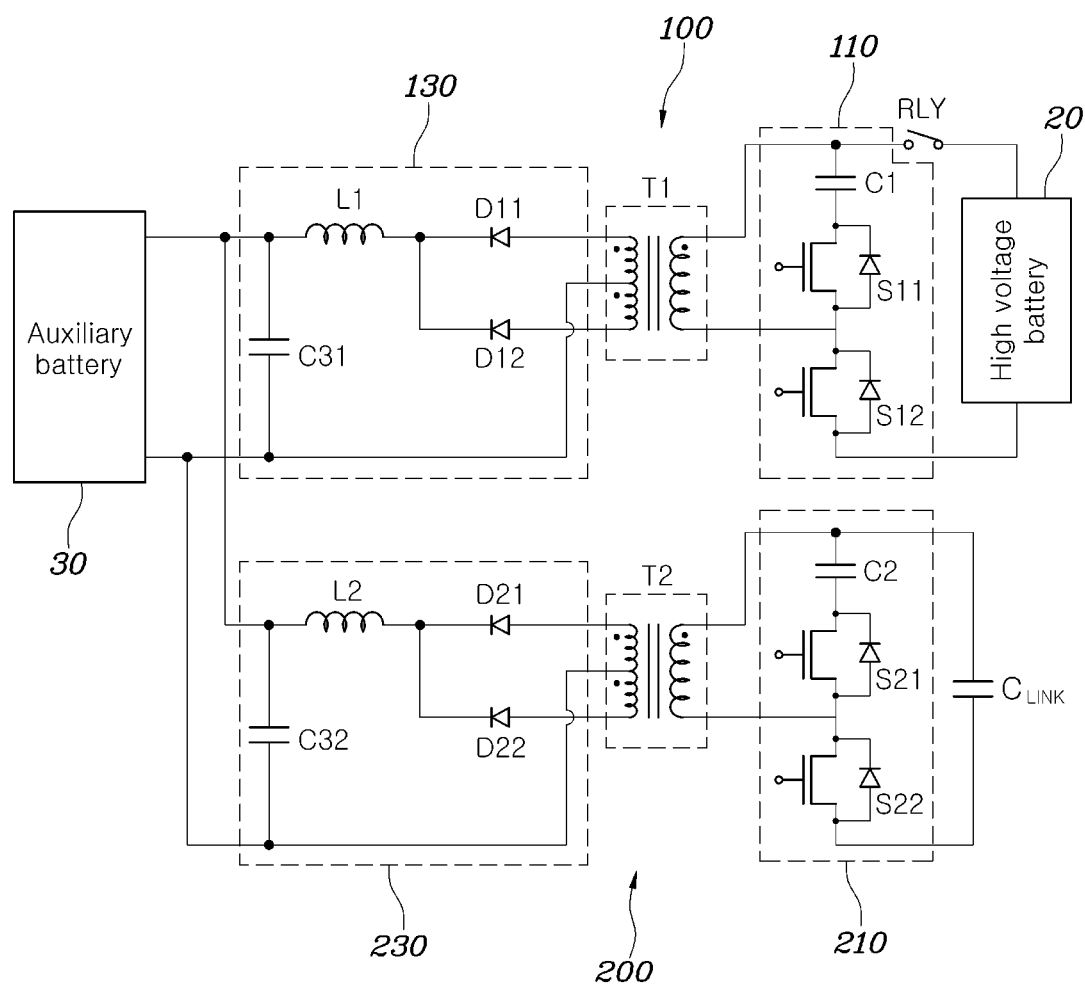
FIG. 2 is a circuit diagram showing low voltage DC-DC converters of the power conversion system for vehicles according to an exemplary embodiment of the present invention in more detail.

FIG. 2 is a circuit diagram showing the LDCs of the power conversion system for vehicles according to an exemplary embodiment of the present invention in more detail. Referring to FIG. 2, the first LDC 100 may include an AC generation circuit 110 configured to convert the energy stored in the high voltage battery 20 into an AC voltage and provide the AC voltage to a primary coil of a transformer T1, the transformer T1 including the primary coil and a secondary coil, and a DC generation circuit 130 configured to convert an AC voltage induced in the secondary coil of the transformer T1 into a DC voltage and provide the DC voltage to the auxiliary battery 30 and an electronic load (not shown).

The AC generation circuit 110 may include a capacitor C1, and a first switching element S11 and a second switching element S12 which are serially connected between both terminals of the high voltage battery 20. A first end of the primary coil of the transformer T1 may be connected to the connection node of the capacitor C1 and the high voltage battery 20, and a second end of the primary coil of the transformer T1 may be connected to the connection node of the first switching element S11 and the second switching element S12.

When the second switching element S12 turns on and the first switching element S11 turns off, the energy supplied from the high voltage battery 20 may be accumulated in the primary coil of the transformer T1. Subsequently, when the second switching element S12 turns off and the first switching element S11 turns on, the primary coil of the transformer T1 and the capacitor C1 form a current loop and thus the energy accumulated in the primary coil of the transformer T1 is returned through the capacitor C1. In other words, when the first switching element S11 and the second switching element S12 alternately turn on/off repeatedly, current alternately flows in opposite directions and thus AC power (voltage) may be applied to the primary coil of the transformer T1.

The primary coil and the secondary coil of the transformer T1 may be electromagnetically coupled to each other having a turn ratio suitable to convert the output voltage of the high voltage battery 20 into a desired voltage level. Particularly, the secondary coil may include two coils which connected to each other in series and have the same turn ratio.

The DC generation circuit 130 may include diodes D11 and D12 respectively connected to two secondary coils to rectify AC voltages induced by the secondary coils to output a voltage having a positive value, and an inductor L1 and a capacitor C31 which include a filter configured to filter power which has passed through the diodes D11 and D12. Specifically, the secondary coil of the transformer T1 may include first and second secondary coils connected to each other in series, the anode of the first diode D11 may be connected to a first end of the first secondary coil, the anode of the second diode D12 may be connected to a first end of the second secondary coil, and the cathode of the second diode D12 may be connected to the cathode of the first diode D11. The cathodes of the first diode D11 and the second diode D12 may be connected to a first end of the inductor L1 constituting the filter, and a second end of the inductor L1 may be connected to a first end of the auxiliary battery 30. In addition, a first end of the capacitor C31 constituting the filter may be connected to the first end of the auxiliary battery 30, and the connection node of a second end of the capacitor C31 and the first and second secondary coils may be connected to a second end of the auxiliary battery 30.

The second LDC 200 has substantially the same circuit configuration as the first LDC 100 aside from the position to which the input terminals are connected. The second LDC 200 may include an AC generation circuit 210 configured to provide the energy stored in the high voltage battery 20 to the primary coil of a transformer T2, the transformer T2 including the primary coil and a secondary coil and configured to transform the level of an AC voltage applied to the primary coil to induce the transformed AC voltage in the secondary coil, and a DC generation circuit 230 configured to convert the AC voltage induced in the secondary coil of the transformer T2 into a DC voltage and provide the DC voltage to the auxiliary battery 30 and an electronic load (not shown).

The AC generation circuit 210, the transformer T2 and the DC generation circuit 230 have substantially the same configuration and operation as those of the first LDC 100, and thus those skilled in the art may embody the same even if detailed description thereof is omitted. The power conversion system for vehicles according to an exemplary embodiment of the present invention may include a switching unit such as a relay RLY configured to control an electrical connection between the high voltage battery 20 and the first LDC 100. This switching unit may short-circuit when the first LDC 100 is driven and the second LDC 200 is shut off and may be open when the first LDC 100 is shut off and the second LDC 200 is driven.

In an exemplary embodiment of the present invention, when the first LDC 100 is shut off and the second LDC 200 is driven corresponds to a state in which the high voltage battery 200 is being charged. In particular, the first LDC 100 may be electrically affected by charging power supplied to the high voltage battery 20 or the energy stored in the high voltage battery 20 when the input terminals of the first LDC 100 are connected to the terminals of the high voltage battery 20. Accordingly, the switching unit, which is provided to control electrical connection between the first LDC 100 and the high voltage battery 20 to achieve isolation between the first LDC 100 and the high voltage battery 20, may be operated to be open when the first LDC 100 is not required to be driven.

Additionally, a switching unit may also be disposed between the DC link terminals at which the DC link voltage $V_{LINK}$ is generated and the second LDC 200. However, since the second LDC 200 is driven while the high voltage battery 20 is being charged, the DC link voltage $V_{LINK}$ is not generated when external AC power for charging is not applied, and the input and output terminals of the DC-DC conversion circuit 15 in the OBC 10 including an internal transformer thereof may be isolated. Therefore, the terminals may be in a state in which the influence of the high voltage battery 20 has already been removed. Accordingly, it is not useful to provide the switching unit between the DC link terminals and the second LDC 200.

Figure 3:
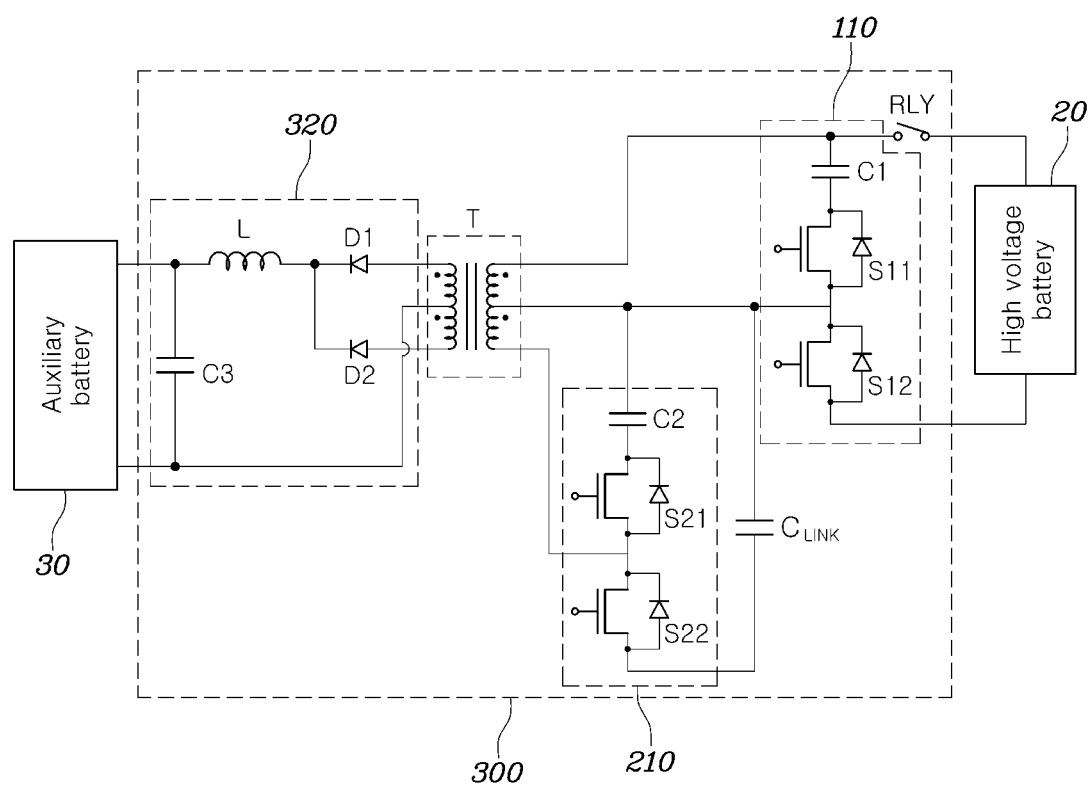
FIG. 3 is a circuit diagram showing low voltage DC-DC converters of the power conversion system for vehicles according to another exemplary embodiment of the present invention in more detail.

FIG. 3 is a circuit diagram showing LDCs of the power conversion system for vehicles according to another exemplary embodiment of the present invention. In the exemplary embodiment illustrated in FIG. 3, the first LDC 100 and the second LDC 200 share a transformer T and a DC generation circuit 320. In the following description, a device including the first LDC 100 and the second LDC 200 sharing the DC generation unit 320 will be referred to as a third LDC 300 for convenience.

The third LDC 300 may include: a first DC generation circuit 100 configured to convert the output voltage of the high voltage battery 20 into an AC voltage; a second AC generation circuit 210 configured to convert the LC link voltage $V_{LINK}$ into an AC voltage; the transformer T which includes serially connected first and second primary coils to which the AC voltages generated by the first AC generation circuit 110 and the second AC generation circuit 210 may be applied, respectively, and a secondary coil electromagnetically coupled to the first and second primary coils, configured to change the levels of the AC voltages applied to the first and second primary coils and induce the AC voltages having changed levels in the secondary coil; and the DC generation circuit 320 configured to convert the AC voltages induced in the secondary coil into a DC voltage and provide the DC voltage to the auxiliary battery 30 and an electronic load (not shown) of the vehicle.

The first AC generation circuit 110 may include a capacitor C1, a first switching element S11 and a second switching element S12 serially connected between both terminals of the high voltage battery 20. A first end of the first primary coil of the transformer T may be connected to the connection node of the capacitor C1 and the high voltage battery 20 and a second end of the first primary coil of the transformer T, that is, the connection node of the first primary coil and the second primary coil, may be connected to the connection node of the first switching element S11 and the second switching element S12.

The second AC generation circuit 210 may include a capacitor C2, a third switching element S21 and a fourth switching element S22 which are serially connected between both terminals of a DC link (DC link capacitor $C_{LINK}$). A first end of the secondary primary coil of the transformer T, that is, the connection node of the first primary coil and the second primary coil, may be connected to the connection node of the capacitor C2 and one terminal of the DC link and a second end of the secondary primary coil may be connected to the connection node of the third switching element S21 and the fourth switching element S22.

When the high voltage battery 20 is being charged, a switching unit RLY may be open and thus electrical connection between the high voltage battery 20 and the first AC generation circuit 110 may be blocked and the switching elements S11 and S12 in the first AC generation circuit 110 are not controlled. In addition, the switching elements S21 and S22 in the second AC generation circuit 210 alternately turn on/off and thus the DC link voltage $V_{LINK}$ may be converted into an AC voltage and this AC voltage may be applied to the second primary coil of the transformer T. Then, the AC voltage induced in the secondary coil may be converted into a DC voltage by the DC generation circuit 320 and the DC voltage may be provided to the auxiliary battery 20 and an electronic load (not shown) of the vehicle.

When the high voltage battery 20 is not charged and the vehicle is traveling, the switching unit RLY short-circuits and thus, the switching elements S11 and S12 in the first AC generation circuit 110 alternately turn on/off to convert the output voltage of the high voltage battery 20 into an AC voltage. The AC voltage may be applied to the first primary coil of the transformer T and the AC voltage induced in the secondary coil may be converted into a DC voltage by the DC generation circuit 320 and provided to the auxiliary battery 30 and the electronic load (not shown) of the vehicle.

In this manner, according to the exemplary embodiment illustrated in FIG. 3, it may be possible to reduce the number of components and decrease manufacturing costs according thereto by sharing the transformer T and the DC generation circuit 320 which converts the AC voltage having a level adjusted by the transformer T into a DC voltage again.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power conversion system for vehicles, comprising:
   a first energy storage device;
   a charging device including a rectification circuit configured to rectify alternating current (AC) power to generate a direct current (DC) link voltage, and a DC-DC converter configured to convert the level of the DC link voltage to generate a charging voltage of the first energy storage device;
   a first low voltage DC-DC converter configured to down-convert the voltage of the first energy storage device to output a low voltage having a predetermined level; and
   a second low voltage DC-DC converter configured to convert the DC link voltage to output the low voltage,
   wherein the first low voltage DC-DC converter and the second low voltage DC-DC converter are selectively driven based on whether the first energy storage device is charged according to input of the AC power.

2. The power conversion system according to claim 1, wherein the first low voltage DC-DC converter is shut off and the second low voltage DC-DC converter is driven when the charging device operates to charge the first energy storage device, and the first low voltage DC-DC converter is driven and the second low voltage DC-DC converter is shut off when the first energy storage device is not charged.

3. The power conversion system according to claim 1, further comprising
   a switching unit configured to control an electrical connection between the first energy storage device and the first low voltage DC-DC converter,
   wherein the switching unit short-circuits when the first low voltage DC-DC converter is driven and the second low voltage DC-DC converter is shut off and the switching unit is open when the first low voltage DC-DC converter is shut off and the second low voltage DC-DC converter is driven.

4. The power conversion system according to claim 2, further comprising
   a switching unit configured to control an electrical connection between the first energy storage device and the first low voltage DC-DC converter,
   wherein the switching unit short-circuits when the first low voltage DC-DC converter is driven and the second low voltage DC-DC converter is shut off and the switching unit is open when the first low voltage DC-DC converter is shut off and the second low voltage DC-DC converter is driven.

5. The power conversion system according to claim 1, wherein the first low voltage DC-DC converter includes:
   an AC generation circuit configured to convert the output voltage of the first energy storage device into an AC voltage;
   a transformer having a primary coil to which the AC voltage converted by the AC generation circuit is applied and a secondary coil for transforming the level of the AC voltage applied to the primary coil based on a turn ratio with respect to the primary coil; and
   a DC generation circuit configured to convert the AC voltage output from the secondary coil of the transformer into a DC voltage.

6. The power conversion system according to claim 5, wherein the AC generation circuit includes a capacitor, a first switching element, and a second switching element, wherein the first switching element and the second switching element are serially connected between both terminals of the first energy storage device.

7. The power conversion system according to claim 6, wherein a first end of the primary coil of the transformer is connected to the connection node of the capacitor and the first energy storage device and a second end of the primary coil of the transformer is connected to the connection node of the first switching element and the second switching element, and the first switching element and the second switching element alternately turn on/off to apply the AC voltage to the primary coil of the transformer.

8. The power conversion system according to claim 5, wherein the transformer includes a first secondary coil and a second secondary coil connected to each other in series.

9. The power conversion system according to claim 8, wherein the DC generation circuit includes:
   a first diode having an anode connected to a first end of the first secondary coil,
   a second diode having an anode connected to a first end of the second secondary coil and a cathode connected to a cathode of the first diode,
   an inductor connected between the cathode of the first diode and a first terminal of an auxiliary battery, and
   a capacitor connected between both terminals of the auxiliary battery, and the connection node of the first secondary coil and the second secondary coil is connected to a second terminal of the auxiliary battery.

10. The power conversion system according to claim 1, wherein the second low voltage DC-DC converter includes:
    an AC generation circuit configured to convert the DC link voltage into an AC voltage;
    a transformer having a primary coil to which the AC voltage converted by the AC generation circuit is applied and a secondary coil for transforming the level of the AC voltage applied to the primary coil based on a turn ratio with respect to the primary coil; and
    a DC generation circuit configured to convert the AC voltage output from the secondary coil of the transformer into a DC voltage.

11. The power conversion system according to claim 8, wherein the AC generation circuit includes:
    a capacitor,
    a third switching element and
    a fourth switching element serially connected between both terminals of the first energy storage device,
    wherein a first end of the primary coil of the transformer is connected to the connection node of the capacitor and the first energy storage device, and a second end of the primary coil of the transformer is connected to the connection node of the third switching element and the fourth switching element, and
    wherein the third switching element and the fourth switching element alternately turn on/off to apply the AC voltage to the primary coil of the transformer.

12. The power conversion system according to claim 10, wherein the transformer includes a first secondary coil and a second secondary coil connected to each other in series.

13. The power conversion system according to claim 12, wherein the DC generation circuit includes:
a third diode having an anode connected to a first end of the first secondary coil,
a fourth diode having an anode connected to a first end of the second secondary coil and a cathode connected to a cathode of the third diode,
an inductor connected between the cathode of the third diode and a first terminal of an auxiliary battery, and
a capacitor connected between both terminals of the auxiliary battery, and
wherein the connection node of the first secondary coil and the second secondary coil is connected to a second terminal of the auxiliary battery.

14. The power conversion system according to claim 1, wherein the first low voltage DC-DC converter includes:
a first AC generation circuit configured to convert the output voltage of the first energy storage device into an AC voltage;
a transformer having a primary coil to which the AC voltage converted by the first AC generation circuit is applied and a secondary coil for transforming the level of the AC voltage applied to the primary coil based on a turn ratio with respect to the primary coil; and
a DC generation circuit configured to convert the AC voltage output from the secondary coil of the transformer into a DC voltage,
wherein the second low voltage DC-DC converter includes a second AC generation circuit configured to convert the DC link voltage into an AC voltage and provide the AC voltage to the transformer, and
wherein the first AC generation circuit and the second AC generation circuit are selectively driven based on whether the first energy storage device is charged according to input of the AC power.

15. A power conversion system for vehicles, comprising:
a first energy storage device;
a charging device including a rectification circuit configured to rectifiy AC power to generate a DC link voltage, and a DC-DC converter configured to convert the level of the DC link voltage to generate a charging voltage of the first energy storage device; and
a low voltage DC-DC converter configured to selectively down-convert one of the voltage of the first energy storage device and the DC link voltage to output a low voltage having a predetermined level,
wherein the low voltage DC-DC converter is configured to selectively convert one of the voltage of the first energy storage device and the DC link voltage into the low voltage based on whether the first energy storage device is charged according to input of the AC power, and
wherein the low voltage DC-DC converter includes:
a first AC generation device configured to convert the output voltage of the first energy storage device into an AC voltage;
a second AC generation device configured to convert the DC link voltage into an AC voltage;
a transformer having serially connected first and second primary coils to which the AC voltages generated by the first and second AC generation devices are applied, respectively, and a secondary coil electromagnetically coupled to the first and second primary coils, the transformer transforming the levels of the AC voltages applied to the first and second primary coils and inducing the transformed AC voltage to the secondary coil; and
a DC generation circuit configured to convert the AC voltage into a DC voltage.

16. The power conversion system according to claim 15, wherein the first AC generation device is shut off and the second AC generation device is driven when the charging device operates to charge the first energy storage device, and the first AC generation device is driven and the second AC generation device is shut down when the first energy storage device is not charged.

17. The power conversion system according to claim 15, further comprising:
a switching unit configured to control an electrical connection between the first energy storage device and the first AC generation device,
wherein the switching unit short-circuits when the first AC generation device is driven and the second AC generation device is shut down and the switching unit is open when the first AC generation device is shut off and the second AC generation device is driven.

* * * * *